United States Patent [19]
Pratap et al.

[11] Patent Number: 5,210,452
[45] Date of Patent: May 11, 1993

[54] SYMMETRIC ARMATURE FOR HIGH CURRENT, AIR-CORE PULSED ALTERNATORS

[75] Inventors: Siddharth B. Pratap; Mike L. Spann; W. Alan Walls, all of Austin, Tex.

[73] Assignee: Board of Regents, The University of Texas System, Austin, Tex.

[21] Appl. No.: 741,062

[22] Filed: Aug. 6, 1991

[51] Int. Cl.⁵ .............................................. H02K 1/00
[52] U.S. Cl. ...................................... 310/12; 310/179; 310/184
[58] Field of Search ................... 310/12, 15, 179, 180, 310/184, 198, 203, 232

[56] References Cited
U.S. PATENT DOCUMENTS

| | | | |
|---|---|---|---|
| 3,652,882 | 3/1972 | Elliott | 310/61 |
| 4,200,831 | 4/1980 | Weldon et al. | 322/8 |
| 4,346,320 | 8/1982 | Davey | 310/179 |
| 4,707,629 | 11/1987 | Wasko | 310/129 |
| 4,710,660 | 12/1987 | McKee et al. | 310/178 |
| 4,841,217 | 6/1989 | Weldon et al. | 310/266 |
| 4,912,343 | 3/1990 | Stuart | 310/14 |
| 4,935,708 | 6/1990 | Weldon et al. | 310/111 |
| 4,939,400 | 7/1990 | Matsushita et al. | 310/208 |

Primary Examiner—Steven L. Stephan
Assistant Examiner—Matthew Nguyen
Attorney, Agent, or Firm—Arnold, White & Durkee

[57] ABSTRACT

A high-energy output, air-core pulsed alternator utilizes stacked armature coils mounted on the outer periphery of an armature rotor. The stacked coils are symmetrically arranged with respect to one another so as to balance axial or longitudinal forces exerted upon the rotor for high energy pulsed output. The alternator may also include any load device which requires high energy output such as, but not limited to, an electromagnetic railgun.

25 Claims, 5 Drawing Sheets

SYMMETRIC ARMATURE FOR HIGH CURRENT, AIR-CORE PULSED ALTERNATORS

The government may own certain rights to this invention. The invention may have been supported in part by a supporting contract with the U.S. Army ARDEC, contract no. DAAA21-86-C-0281.

BACKGROUND OF THE INVENTION

I. Field of the Invention

This invention relates to a pulsed alternator which can deliver high energy pulsed current in response to rotational movement of a rotor through a magnetic field. In particular, the present invention comprises armature coils stacked on the outer periphery of the rotor and symmetrically arranged with respect to one another to balance forces along the longitudinal axis of the rotor when current is discharged through the coils.

II. Description of the Relevant Art

There are many applications that require a high energy pulsed power source which can deliver extremely high power within a relatively short time period. Electrostatic capacitors are typically used to deliver high energy across a low impedance load. Electrostatic capacitors are, however, fairly expensive to manufacture and cannot achieve energy storage per unit mass adequate for certain types of load such as, e.g., mobile, vehicle mounted electromagnetic railguns.

In hopes of providing high energy output necessary for railgun operation (i.e., pulsed output exceeding one million amps), research has produced homopolar generators. While homopolar generators can produce fairly high current within a fairly short discharge time, homopolar generators are relatively low voltage devices, making them unsuitable for higher impedance loads. Conversely, pulsed alternators have been developed which can produce the necessary voltage or power but have numerous shortcomings, such as high internal impedance.

Conventional alternators utilize windings placed circumferentially upon the outer surface of a rotor. Conventional windings utilize a single layer of coiled conductors arranged in a generally non-symmetrical fashion about the rotor's outer surface. Non-symmetrical, conventional windings thereby experience excessive lateral force upon the rotor during very high current discharge. When the single layer, non-symmetrical coil discharges extremely large currents an imbalanced Lorentz force is created along the longitudinal axis of the rotor. The imbalance becomes so severe that bearings and seals quickly wear out or fail during discharge. Thus, conventional pulsed alternators suffer excessive mechanical wear whenever extremely high pulsed current is discharged. Still further, conventional alternators utilize heavy ferromagnetic or non-ferromagnetic materials within their rotor and surrounding stator. These materials add excessive weight causing depletion in alternator output performance; i.e., reduction in energy density and power density output.

SUMMARY OF THE INVENTION

The problems outlined above are in large part solved by the device of the present invention. That is, the air-core compensated pulsed alternator (compulsator) hereof provides low transient internal impedance necessary to deliver pulsed output current exceeding several million amps. Furthermore, the air-core compulsator of the present invention includes a rotor having stacked main armature windings mounted on the outer periphery of the rotor. The stacked armatures or coils of the present invention are arranged symmetrically with respect to one another to balance the axial or longitudinal Lorentz forces upon the rotor when high energy pulsed current is discharged. By stacking the armature coils and by arranging their windings with respect to each other, the forces caused by the magnetic field traversing the rotating rotor are effectively canceled along the longitudinal axis of the rotor. Thus, only the beneficial rotational forces are utilized for the production of high energy output current. Mechanical wear upon various seals and bearings within the present alternator is thereby substantially reduced.

By carefully sizing and positioning the stacked main armature coils, smooth deceleration of the rotor is achieved during the pulsed discharge. Also, by utilizing lightweight materials such as graphite, fiberglass and epoxy composite within the rotor, within the surrounding stator, and within the compulsator assembly, the air-core pulsed alternator of the present invention is both lightweight and compact. Further, by drawing generated current back into a field coil, magnetic field (caused by current traversing the field coil) can be pre-energized or self-excited before discharge operation. This self-excitation principle allows more efficient use of generated output current to not only drive the load but also to perpetuate the magnetic field traversing the rotor.

Broadly speaking, the present invention contemplates a device alternatively known as an air-core, pulsed alternator for delivering large amounts of pulsed current in response to rotation of the rotor. The pulsed alternator includes a rotor and an inner main armature coil mounted on the outer periphery of the rotor. An outer main armature coil is then mounted radially outward from the inner armature coil, wherein the inner and outer main coils are configured to discharge high energy pulse current in response to rotational movement of the rotor through a magnetic field traversing the rotor. Both the inner and outer armature main coils are symmetrically arranged with respect to one another to balance Lorentz forces along the longitudinal axis of the rotor when high energy pulsed current is discharged.

The inner and outer main coils are symmetrically arranged by using one coil as a template for the other. In particular, the outer coil is made by transposing the inner coil such that the inner and outer coils are symmetrical about each other. The coil can be defined as residing within an arcuate plane having a vertical and horizontal center line and a Z axis traversing the center of the coil perpendicular to the plane. The outer coil is made substantially identical to the inner coil by rotating the inner coil 180° about the Z axis and then rotating the inner coil 180° about the vertical center line. The outer coil can also be made substantially identical to the inner coil by rotating the inner coil 180° about a horizontal center line. Using either method allows the outer coil to be made substantially symmetrical to the inner coil to balance axial or longitudinal forces exerted upon the rotor when high energy pulsed current is discharged through the inner and outer coils.

In another aspect of the present invention, the pulsed alternator comprises a stator encasement having at least two energizeable field coils mounted on the inner surface of the encasement to form a magnetic field therebetween. Field coils can be energized from and external current source to provide initial magnetic field. Thereafter, current may be supplied from excitation windings placed within the rotor. As the rotor spins along its longitudinal axis and within the initial magnetic field, current is generated within the excitation windings and discharged to the field coils. Thus, while an initiation current may be necessary to begin the magnetic field, once the field is begun, generated current from excitation windings provide the remainder of the necessary field.

In yet another aspect of the present invention, each inner and outer coil includes a conductive path comprising a plurality of wires bound together in a wound position to discharge high energy pulsed current through the wires in response to rotational movement of the rotor. Both the inner and outer conductive paths are wound in a planar configuration with a horizontal center line extending within the plane. The inner and outer conductive paths each have upper and lower pole start conductors at the end of each respective inner or outer coil. Pole start conductors extend outside the coils to an external load such as a railgun, etc.

In yet another aspect of the present invention, a pair of conductive main brush slip rings couple to upper and lower pole start conductors to provide current to the external load. Main brush slip rings can be mounted on one of two shafts which extend from the cylindrical rotor along the rotor's longitudinal axis. Field brush slip rings can also be mounted adjacent main brush slip rings to provide current from excitation windings to the field coil. Main brush slip rings and field brush slip rings allow either output current to be discharged from the present invention, or initiation current to be fed from an external source to the field coils during magnetic field initiation. Thus, main or field brush slip rings can be conductively connected to load device (i.e., railgun) and source device (i.e., power source), respectively, via brushes placed upon the stator encasement proximate respective slip rings.

DESCRIPTION OF THE DRAWINGS

This invention will further be illustrated by reference to the appended drawings which illustrate particular embodiments of the pulsed alternator device of this invention.

DESCRIPTION OF THE PREFERRED EMBODIMENTS

Figure 1:
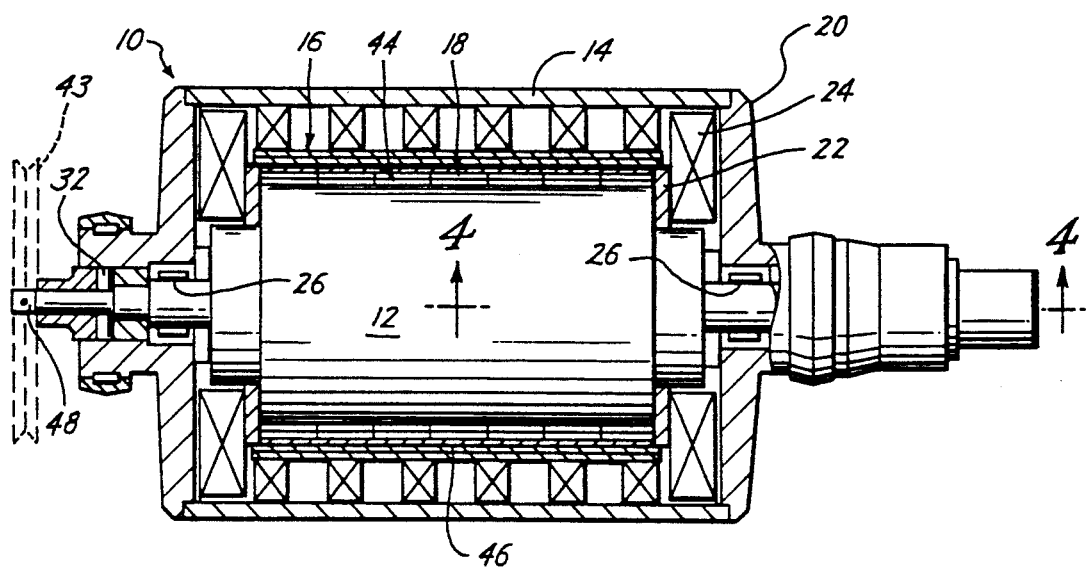
FIG. 1 is a partial cross-sectional view of a compulsator and stator assembly of a pulsed alternator in accordance with the present invention.

Turning now to the drawings, FIG. 1 illustrates a partial cross-section of an alternator 10 of the present invention. Alternator 10 includes rotor 12 surrounded by a stator casing 14. Stator casing 14 can be made of any lightweight material such as, e.g., a ribbed stainless steel weldment or epoxy composite material. Furthermore casing 14 can be made of ferromagnetic or non-ferromagnetic material, but is preferable that it be made from non-ferromagnetic material. Lightweight, non-ferromagnetic composition allows containment of internal elements necessary to achieve a lightweight portable alternator structure. Contained within casing 14 are alternate layers of stainless steel and glass/epoxy composite, axially laminated to form stator structure 16.

FIG. 1 also shows compensating windings 18 of a compulsator which radially surrounds rotor 12. Compensating windings 18 can be either stationary or counter rotating with respect to rotor 12 to increase the output voltage from alternator 10 and to reduce the internal impedance of alternator 10 at the moment of peak output. Thus, a compulsator is well-suited to provide pulsed power output for several reasons. First, alternator 10 provides energy storage, voltage generation, and output pulse conditioning in a single element. Conversely, conventional alternators rely upon intermediate energy storage elements and/or pulse conditioning circuits to allow mating with the load device. Elimination of additional circuit elements results in a high efficiency system relative to conventional alternator supplies. If the present system uses an electromagnetic railgun load, efficiency is further enhanced due to output AC pulse being purposely designed to approach a current zero during time when railgun projectile exits the railgun bore. Thus, load matching/timing achievable with the present invention allows recovery of inductive energy in the load device back into the rotor coil. Thus, compulsator 10 provides pulse shaping as well as high power density output exceeding conventional supplies. Furthermore, compulsator 10 provides an opportunity to tailor the output current according to well-known techniques further described herein.

At both ends of casing 14 are stator end plates 20 and compensating end plates 22. Stator end plates 20 help maintain the axial or longitudinal relative position of both stator 16 and rotor 12. The function of compensating end plates 22 will be further discussed below. Field coils 24 are shown coupled to the inside surface of stator casing 14 and stator end plates 20. Because field coils 24 must be fairly large in order to generate necessary large magnetic fields, field coils 24 are shown preferably placed on the casing 14 and not on rotor 12. Conventional machines which place field coils 24 upon the outer periphery of rotor 12 cause the rotor to be larger and heavier than that which is desired for high performance, high energy output of the present invention. Thus, by placing coils 24 upon the casing, rotor 12 can be substantially lightened. The advantage of using lightweight composite rotors is that lightweight rotors can be spun to higher speeds and thus kinetically store more energy per unit mass or volume than heavier rotors.

Hydrostatic support bearings 26 are shown for maintaining rotor 12 position within stator casing 14. Bearings 26 are made of aluminum bronze and serve the function of providing adequate support stiffness and damping for the rotor. In addition to support bearings 26, thrust bearings 32 serve, inter alia, to maintain longitudinal position of rotor 12 during application of rotational torque upon thrust shaft 28 (shown in FIG. 2). Furthermore, thrust bearings 32 prevent longitudinal displacement of the rotor caused by the interaction of Lorentz (J×B) forces within alternator 10.

Figure 4:
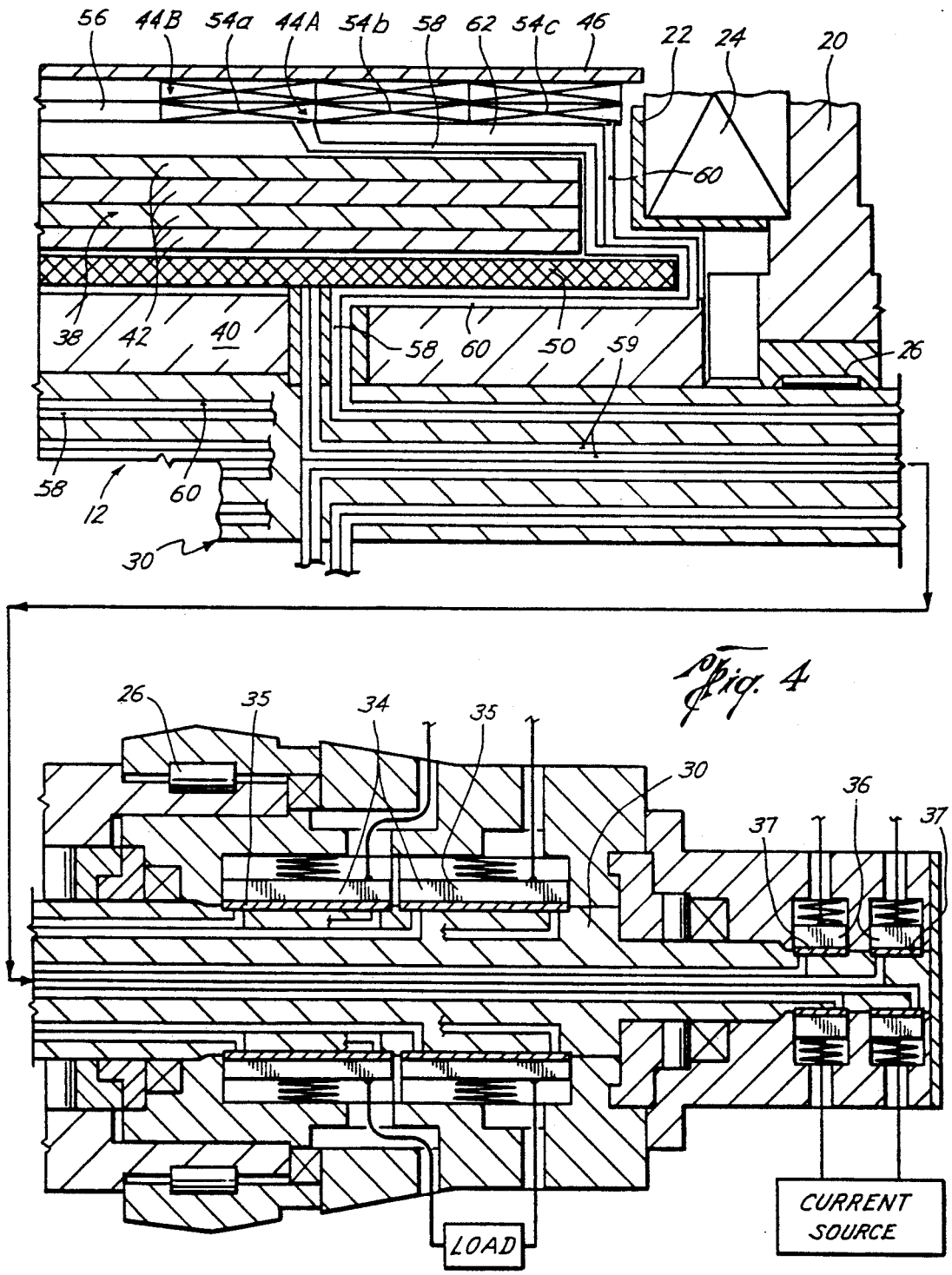
FIG. 4 is a section along 4—4 in FIG. 1.

Referring to FIG. 4, at the opposite end of alternator 10 from thrust bearings 32 are two sets of main brushes 34 which serve to output discharged electrical current from alternator 10. Main brushes 34 are connected to the inside surface of casing 14 and are radially spaced about connector shaft 30. Also shown radially spaced about connector shaft 30 are two sets of field excitation brushes 36. Brushes 36 are electrically coupled to field coils 24. A small capacitor, not shown, can be discharged onto field brushes 36, causing an initialization current within field coils 24, thereby forming an initial magnetic field within alternator 10. This excitation process can be rectified and used to build additional field current within a relatively short period of time, preferably within 0.25 seconds before full-field current (preferably 43 kA) is reached. Once full-field current is reached, switching of the output load is accomplished with a plurality of parallel solid-state devices, to begin the ensuing pulse output. Thus, activation of output current to a load device or activation of excitation current to the field coils is achieved by electrically coupling main brushes 34 or field brushes 36, respectively.

Figure 2:
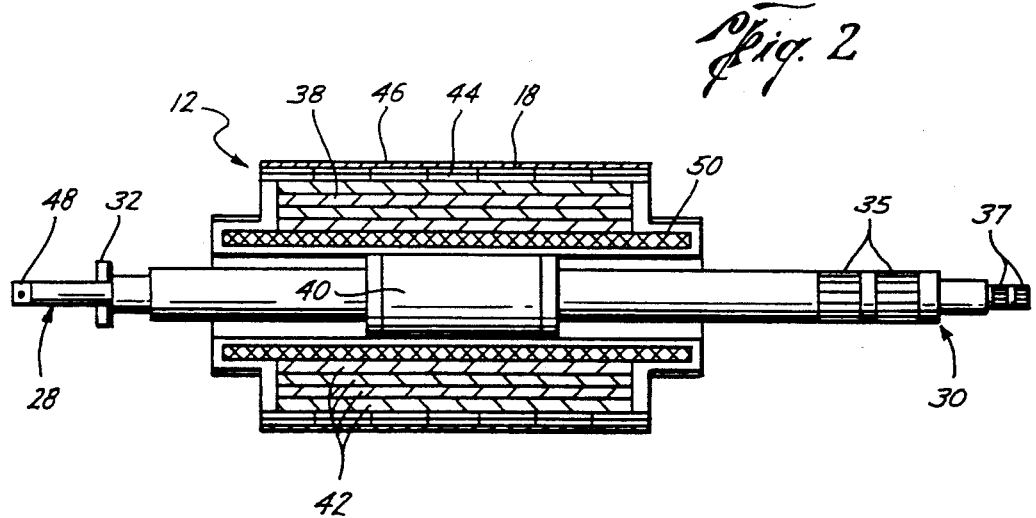
FIG. 2 is a cross-sectional view of a rotor assembly of a pulsed alternator in accordance with the present invention.

Turning now to FIG. 2, a cross-sectional view of rotor 12 is illustrated. Rotor 12 is preferably a two-pole design to produce an alternating (AC) output. However, various multi-pole designs can be used provided high energy output is achieved. Therefore, various alternator 10 and rotor 12 designs fall within the scope and spirit of the present invention provided, however, that the discharge energy is extremely high with minimum axial force occurring on rotor 12 during discharge. Although the two-pole design is preferred, said design subjects the full rotor volume to the full excitation flux. This causes extreme eddy currents of heating in any solid metal components of rotor 12. This heating can be minimized by material selection, by reducing the time the excitation field is present, and by internally shielding conductive rotor components. All of these techniques are provided in the present invention to allow the use of a high strength metal shafts 28 and 30, discussed further below. A 17 kV field excitation armature winding or coil 50 may be included in the rotor (separate from the main armature coil) to decrease field excitation time and to quench the field by regenerating the field inductive energy back into rotor 12. Also, shaft eddy current heating is minimized by water cooled copper sleeves which shield the stub shafts from the excitation flux. Field charging is also enhanced by breaking conductive paths in stator 16 which would otherwise experience circulating currents opposing field drives.

Rotor 12 shown in FIG. 2 includes several necessary components such as a cylindrical flywheel 38 mounted upon a cylindrical flywheel support ring 40. Flywheel 38 is made up of a plurality of composite rings 42 using both graphite and S-glass (i.e., special fiberglass) reinforcement. These rings provide the bulk of the energy storage and serve to support main armature windings 44. Each flywheel ring 42 is installed with interference (i.e., a smaller diameter ring is installed into the inner dimension of a larger diameter ring) using a hydraulic assisted press fit method wherein hydraulic pressure is used to expand one or more rings so that the interference assembly can be formed. Epoxy is used as the working fluid so that an interfacial bond is established between rings.

Main armature winding 44 is preferably a two-pole six turn/pole configuration with the two poles arranged in parallel along the arcuate peripheral surface of flywheel 38. The details of armature winding 44 will be further discussed in FIGS. 4 and 5 herein.

Main armature windings or coils 44 are retained upon rotor 12 by an armature banding 46 located radially outside of main armature 44. Banding 46 function to maintain armature windings 44 in contact with flywheel 38 during rotation of rotor 12. A high strength, high modulus graphite fiber composite tube may be used for banding 46. Banding 46 is installed with heavy interference after main armature winding has been epoxy impregnated. Approximately 5-6 MPa radial interference pressure between armature 44 and flywheel 38 is maintained at full rotational speed of rotor 12 to enhance the bond shear strength and overcome radially outward electrical magnetic loading in localized areas within armature windings 44. Armature banding 46 thickness is minimized to improve electrical performance of alternator 10. In particular, the electrical magnetic coupling between armature winding 44 and compensating winding is increased if armature banding 46 thickness is minimized.

Compulsator design is thereby driven by electromagnetic loading arising from field coil 24 self-loading, compensating winding currents, transient fields generated by armature windings 44, and the interactions between all of these effects. As rotor 12 rotates during the generation of a pulse, loading shifts to different stator 16 components. When armature windings 44 and compensating windings 18 are aligned (minimum inductance position), the armature currents are well compensated by image currents in the compensating winding. At maximum inductance, when the two windings are 90° out of phase, the armature flux produces eddy currents in all other stator conductive structures. To minimize field charging time and losses, shielding of the field is diminished. This allows field coil 24 to couple flux from the discharge and produces additional field current. The interaction of armature flux with the current in field coil 24 also generates additional load on the field coil 24 conductors. Meanwhile, stator casing 14 serves to support the two-pole or multi-pole solenoidal type field coil 24 and transfers the stator discharged torque to casing 14. As shown in FIG. 1, stator end plates 20 house the shaft radial bearings 26 and associated seals. Due to the length of the main brushes 34 and field excitation brushes 36, additional support 26 may also be used.

Shown on opposite ends of rotor 12 of FIG. 2 are thrust shaft 28 and connector shaft 30. At the distal end of thrust shaft 28 is a drive coupling 48 which can be releasably connected to an external drive mechanism such as an induction motor, gas turbine or other suitable mechanical device 43 as shown in FIG. 1. Thrust bearing 32 is shown rotably coupling the external surface of thrust shaft 28 to casing 14. Located on the opposite end of rotor 12 from thrust shaft 28, and mechanically coupled to thrust shaft 28 and flywheel 38, is connector shaft 30. At the distal end of connector shaft 30 are a pair of main brush slip rings 35 and a pair of field excitation brush slip rings 37. Copper coated aluminum brush rings are preferably used for both sets of slip rings 35 and 37 to minimize mass and inertia, which directly affects torsional stresses in shaft 30 during the discharge deceleration event.

An iron-nickel alloy, Invar ™, may be used as the structural portion of shafts 28 and 30 for its low coefficient of thermal expansion. Other forms of alloy can also be used provided, however, that they also have low coefficients of thermal expansion. As the copper conductor slip rings are resistively fed by the pulsed output, the iron-nickel alloy helps prevent excessive shaft thermal growth and minimizes bearing clearance changes over the operating sequence. Thrust end shaft 28, having means for receiving a driving mechanism such as a turbine, also supports thrust bearing 32 and is fabricated from a high-strength stainless steel alloy. Both shafts 28 and 30 are preferably fitted with water cooled copper alloy eddy current shields, not shown for convenience. Eddy currents generated in the shields oppose the excitation field and exclude it from the shaft components. The shields, however, do experience substantial losses and require active cooling for multi-pulse output sequences. A water-glycol solution can be introduced through a pressurized gallery sealed with carbon ring seals on each end of rotor 12.

Field excitation armature windings 50 are shown in FIG. 2 between flywheel 38 and shafts 28 and 30. Field excitation windings 50 provide field coil excitation current necessary for maintaining magnetic field within alternator 10. Thus, windings so provide a current path necessary to charge field coils 24. Field excitation windings 50 may be a two-pole configuration which is 90° phase-shifted from main armature winding 44 in order to avoid electromagnetic coupling. Each excitation winding or coil 50 has a plurality of turns, preferably twelve turns, and the two poles are connected in series so that peak voltage generation is increased and field coil charging times are reduced. Excitation winding 50 is electrically coupled to field brush slip rings 37 to complete the circuit. Field brushes 36 can be electrically coupled upon rings 37 to output activation current from coil 50 to field coils 24. Winding conductors of excitation coil 50 are sized to allow a set number of consecutive charging or dump cycles without active cooling. Expected temperature rise per cycle can be approximately 15° C. in the conductors and 10° C. when averaged with the surrounding epoxy used to encapsulate the windings.

The cross-sectional alternator of FIGS. 1 and 2, wherein rotor 12 length (L) is approximately 1.7 m and width (W) is approximately 1.0 m, can produce the following parameters of Table I:

TABLE I

| Rotor Speed | 8,600 rpm |
| --- | --- |
| Rotor Energy Storage | 210 MJ |
| Peak Excitation Flux Density | 2.4 T |
| Peak Armature Voltage | 5.8 kV |
| Peak Current Rating | 3.2 MA |
| Maximum Discharge Port | 21.3 MNm |
| Average Armature Shear Stress | 7.5 MPa |
| Excitation Armature Voltage | 17.0 kV |
| Excitation Current | 42.0 kA |
| Machine Mass | 18,500 kg |

Figure 3:
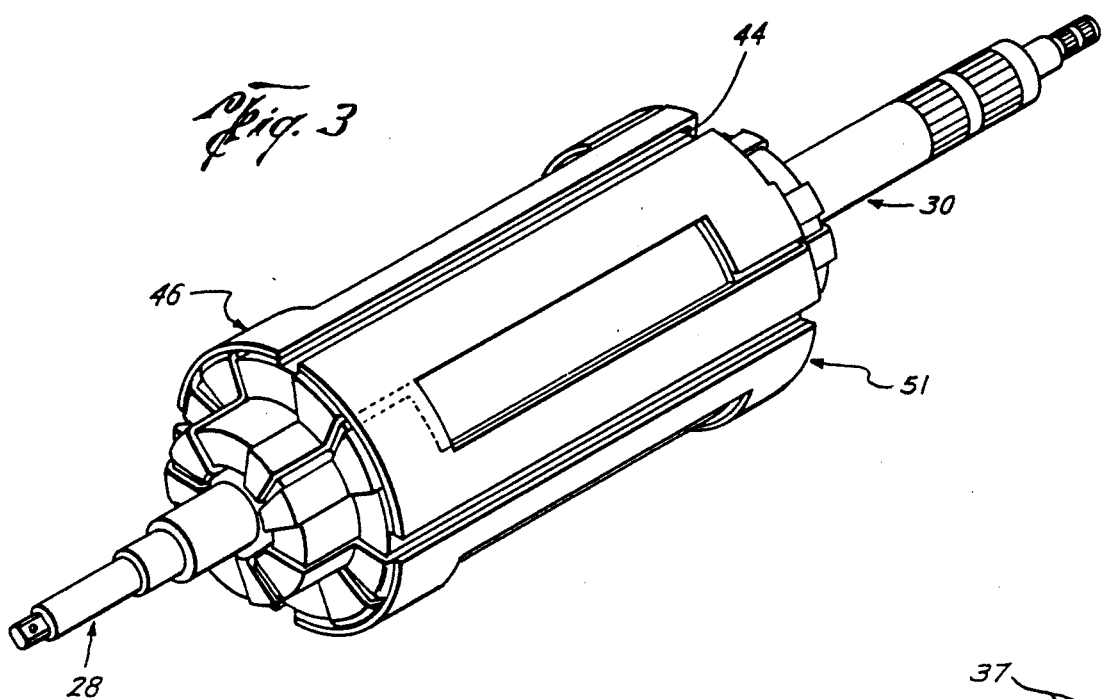
FIG. 3 is a perspective view of a multi-pole rotor assembly of a pulsed alternator in accordance with the present invention.

The alternators of FIGS. 1 and 2 relate to a two-pole alternator. However, the present invention also includes multi-pole embodiments to be described hereinbelow. The normal advantages of multi-pole configurations include: a reduction in shaft speed to achieve the same output pulse, a reduction in total magnetic field energy required by directing flux only through the main armature coils and not through the center portion of the rotor, a simplification of rotor construction especially in the armature coil end turns, and a more uniform distribution of coil mass and discharge portions around the rotor periphery. FIG. 3 illustrates another embodiment of the present invention utilizing a multi-pole configuration. The cut-away view of a multi-pole design 51 of a multi-pole rotor indicates more than two poles and associated main armature windings 44 contained within armature banding 46.

Figure 3A:
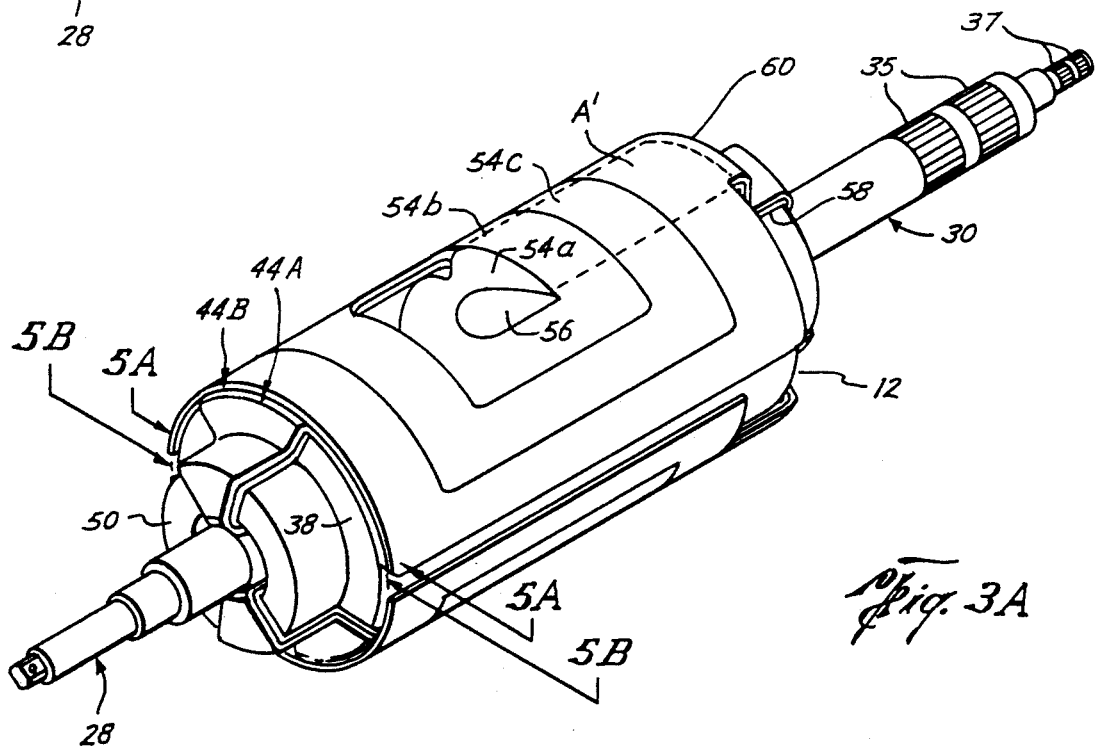
FIG. 3A is a perspective view of a two pole rotor assembly with banding removed of a pulsed alternator in accordance with the present invention.

Shown in FIG. 3A is a two pole rotor assembly of the present invention. Wound about each pole is an inner 44A and an outer 44B main coil mounted on the outer periphery of rotor 12. In particular, inner main coil 44A is coupled to the outer surface of flywheel 38, and outer main coil 44B is radially spaced from inner coil 44A and also coupled to flywheel 38B. The ends of each inner and outer main coil extend outside the coil area as shown in FIG. 3A. The ends of each coil is coupled to main brush slip rings 35 via upper pole start conductor 60 and lower pole start conductor 58. Details as to how the connection from the stacked inner and outer main coils to main brush slip rings 35 will be described in detail below. Each turn of main armature coils 44A and 44B are represented by end turns 54a, 54b and 54c.

Turning now to FIG. 4, a partial cut-away and exploded view along section 4—4 of FIGS. 1 and 2 is shown. Windings 44 comprise a coil conductive path of stranded or braided conductors, commonly referred to aluminum litz wires. Each stranded litz wire is individually insulated from each other and retained upon the outer surface of flywheel 38. Armature banding 46 is shown configured radially outside the coil conductive path to retain the coil during rotational movement of rotor 12. Rotor 12, shown in FIG. 2, has an arcuate surface upon which main armature coils 44 are radially mounted about the arcuate surface equidistant from each other. The wound conductors form end-turns 54 surrounding a pole spacer 56. The innermost end-turn 54a represents the closest coil or loop wound about pole spacer 56. Subsequently, end-turn 54b is the next furthest out and 54c is the last end-turn, furthest from pole spacer 56. Thus, FIG. 4 illustrates three end-turns representing three winds or loops of main armature coil 44.

Figure 5A:
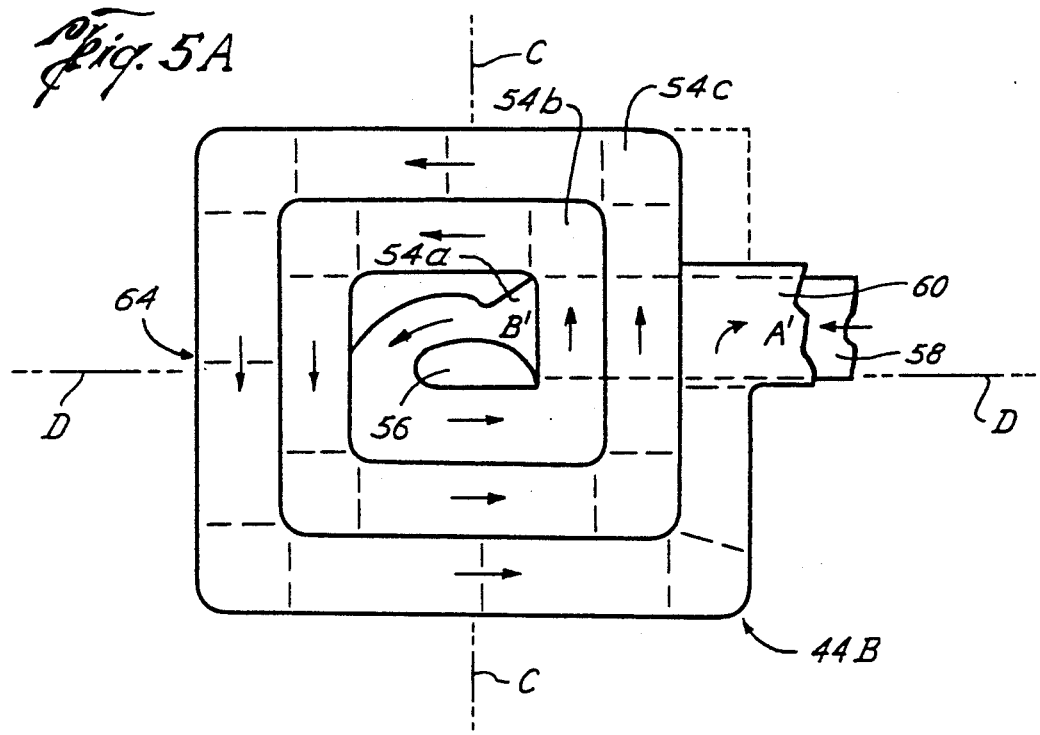
FIGS. 5A-5B are isometric planar views of outer and inner main armature coils, respectively, taken along section 5A and 5B in FIG. 3A.
Figure 5B:
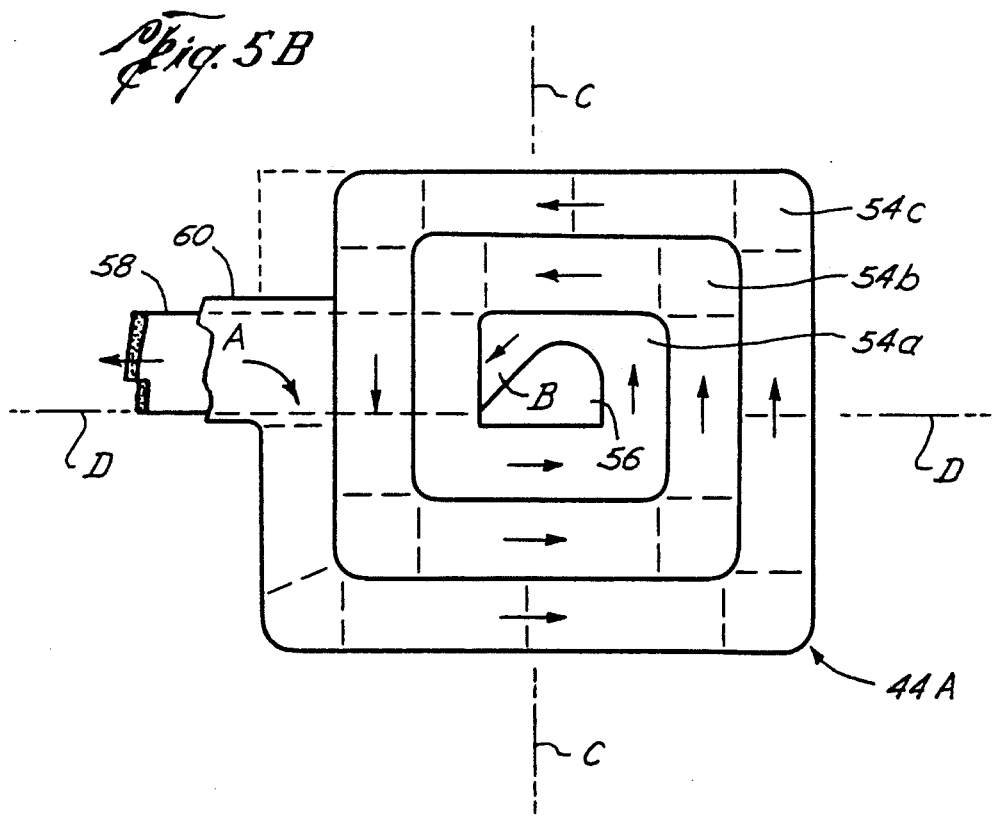

Further details as to the symmetrical arrangement of the three windings is illustrated in FIGS. 5A-5B. It is important to note that the present invention proposes a plurality of loops, either more or less than three loops, however, for convenience only three loops are shown in FIGS. 3A, 4, 5A and 5B. Windings for end-turn 54 geometry is shown as a cross-section view in FIG. 4 extending substantially the length of rotor 12. Thus, a key design issue results from the trade-off between main armature voltage generation, electromagnetic discharge loading, and rotor 12 length. From a rotor dynamics viewpoint, a shorter rotor 12 is more rigid and therefore more likely to operate sub-critically. Due to the high armature currents required of the present invention, the stranded armature conductors are necessarily large (preferably around 2.5 cm thick×22.8 cm wide) to prevent excessive temperature rise and inductance within armature windings 44. Accomplishing the end-turns 54 for these conductors takes a large fraction of rotor 12 active length. By placing field coil 24 end-turns outside the armature end-turns 54, generation of the required voltage output of alternator 10 can be achieved with a minimum rotor active length.

Of importance to the present design is the symmetrically designed end-turns 54 of the stacked armature windings 44, as shown in FIG. 5. FIG. 4 illustrates the routing of the two ends of each inner 44A and outer 44B main coil. In particular, one end of the braided conductors which form either coil 44 is called lower pole start conductor 58 and the other end is called upper pole start conductor 60. Lower pole start conductor 58 forms the inner loop or end-turn 54a and thereby connects one end of winding 44 to one ring of main brush sip rings 35. Conversely, the other end of either coil 44, or end-turn 54c, is upper pole start conductor 60 which is routed to the other ring of main brush slip ring 35. Thus, a loop or circuit is formed in each winding 44 with main brush slip rings 35 to deliver current generated within windings 44 to an external load via main brushes 34 which are contractible to main slip rings 35. FIG. 2 illustrates in more detail the routing configuration of lower and upper pole start conductors 58 and 60 between main windings 44 and main slip rings 35.

FIG. 4 further illustrates the routing of conductors 59 from field excitation windings 50 to field brush slip rings 37. Both main slip rings 35 and field slip rings 37 are made of a copper-coated aluminum ring placed on connector shaft 30 outer surface in radial proximity to corresponding brushes 34 and 36, respectively. Like lower and upper pole start conductors 58 and 60, respectfully, conductors 59 arise from the ends of each respective coil and extend radially inward towards the center of fly wheel 38. All of the conductors which are connected to respective ends of each coil, are eventually routed to slip rings (main slip rings 35 or field slip rings 37) arranged on only one end of rotor 12 (i.e., arranged on connector shaft 30).

As shown in FIG. 4, in order to retain lower and upper pole start conductors 58 and 60 upon fly wheel 38 and connector shaft 30, lower pole start conductor banding 62, armature banding 46, compensating end plate 22 all actively participate in resisting centrifugal forces and electromagnetic coupling which act upon conductors 58 and 60. Furthermore, by ensuring that each main armature end-turn 54a-54c is made within the same plane as the active armature, centrifugal loading of armature winding 44 is uniform as well as electromagnetic loading on each conductor. Also, an important advantage of the present invention is that both lower and upper conductors 58 and 60, for each and every armature winding 44, exit on one end of rotor 12. The common exit point minimizes inductive loading as well as providing inductive balance between each winding.

To further aid inductive balancing and to minimize axial forces within the rotor, a symmetrical stacking of preferably two coils, outer main coil 44B and inner main coil 44A, are shown in FIGS. 5A-5B. The stacked main armature windings, shown in FIGS. 5A-5B, exhibit end-to-end symmetry so that two layers of end-turns 54a-c are symmetrically arranged around each pole 56 as shown in FIG. 5. For ease in illustration, outer layer 44B is drawn off of lower layer 44A and is shown in FIG. 5A. It is to be appreciated that two or more layers of armature windings can be utilized without departing from the scope and spirit of this invention. In particular, provided each layer is symmetrical about the other, numerous layers can be stacked upon each other on the arcuate surface of fly wheel 38 to balance the axial or longitudinal forces on rotor 12.

FIGS. 5A-5B illustrate conductive path windings, wherein the conductive path comprises a plurality of parallel-placed transposed aluminum litz wires stranded or bound together to form a conductive path. Three windings are shown for each outer and inner layers 44B and 44A, respectively. There may be 50 braided wires, approximately 9 inches wide and 0.5 inches thick, per layer forming the conductive path. Winding of the conductive path, may begin at point A and A' and end at point B and B' shown in FIGS. 5A-5B. Thus, there is winding symmetry between outer layer 44B and inner layer 44A. In particular, inner layer 44A is the same as outer layer 44A after outer layer 44B is either (i) rotated 180° about vertical center line C—C, or (ii) rotated 180° within its own plane and then rotated 180° about horizontal center D—D. Using either method allows the duplication and symmetrical transposition of outer layer 44B from inner layer 44A. Also, this form of conductor symmetry ensures that electromagnetic forces emanating from end-turns 54a-c via Lorentz forces balance each other in the axial direction of rotor 12. The current path, represented by the arrows in FIGS. 5A-5B, is in the same direction for both outer layer 44B and inner layer 44A. Thus, each layer of the two-layer embodiment carries one-half of the total current discharged from the stacked windings. If a two-pole embodiment is used, two corresponding stacked windings will thereby output the total discharged current to the low impedance device, such as a railgun or laser flashlamp. For ease in illustration, FIGS. 5A-5B represents flattened outer and inner main armature windings 44. However, windings 44 are generally arcuate in conformity with the arcuate outer periphery of rotor 12.

The terminal ends of each conductive path A, A', B and B' extend outside the outer and inner layers 44B and 44A, respectively, and connect with main brush slip rings 35 via upper and lower pole start conductors 60 and 5B, respectively. Ends B and B' extend underneath the inner layer 44A and outer layer 44B, respectively, and couple with lower pole start conductor 58 shown in FIGS. 3A and 4. Conversely, terminal ends A and A' extend outside the inner and outer layers 44A and 44B thereby coupling with upper pole start conductor 60, as shown in FIGS. 3 and 4.

Figure 6A:
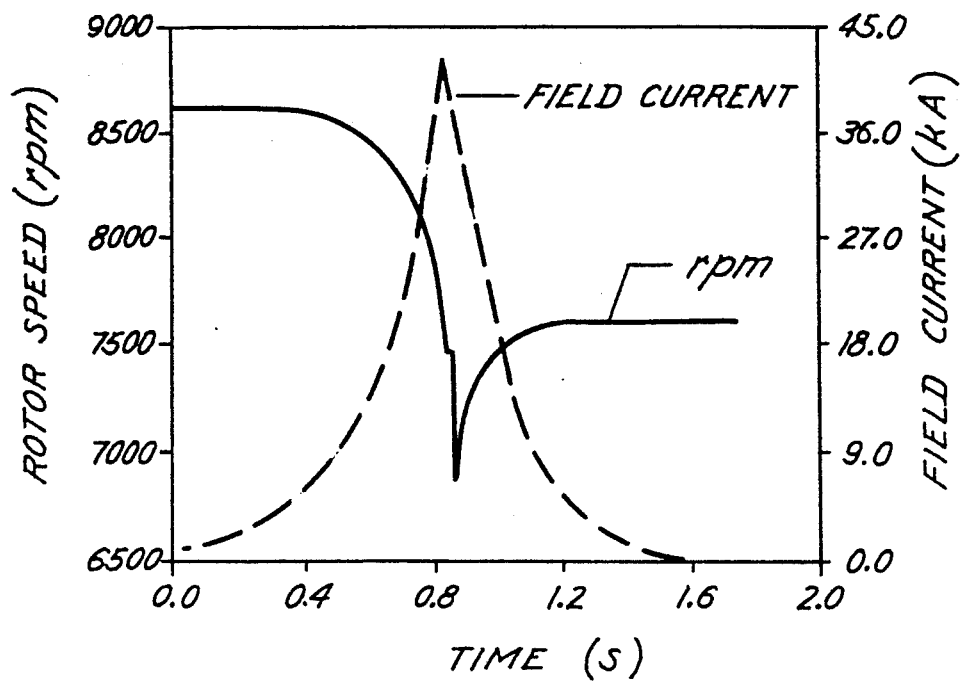
FIG. 6A is a graph illustrating rotor speed as a function of field current.
Figure 6B:
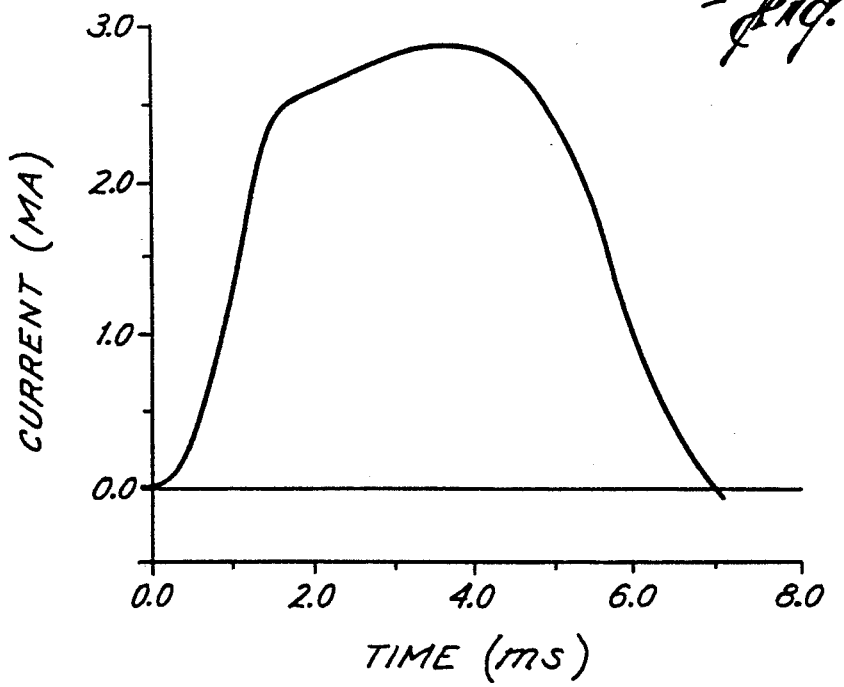
FIG. 6B is a graph illustrating the magnitude of pulsed discharged current as a function of time.

Turning now to FIG. 6A, actual rotor speed and field or excitation current are shown as a function of time using the self-excited air-core compulsator of the present invention having the characteristics shown above. FIG. 6A illustrates a substantial drop in rotor speed during the ramping of field current. This inverse relationship is due primarily to kinetic energy transfer from rotor 12 to magnetic energy stored by field coils 24. FIG. 6A also shows the regeneration of the magnetic field energy back into the rotor after the pulsed discharge is completed. This explains the rapid increase in rotor speed during the second half of the field excitation cycle shown in FIG. 6A. FIG. 6B illustrates pulsed discharge current available through main brushes 34 of the present invention. The pulse current of FIG. 6B is attained using the self-excited air-core design of the present invention having two-pole rotating armature configuration which delivers peak current of 3.2 MA, peak voltage of 5.8 kV, which can deliver a maximum energy/pulse of 36 MJ with maximum rotor speed of 8,600 rpm. FIG. 6B also illustrates the shape of the output current pulse into a variable impedance load such as a railgun.

The foregoing description of the present invention has been directed to particular preferred embodiments. It will be apparent, however, to those skilled in the art that modifications in the present apparatus may be made without departing from the scope and spirit of the invention. For example, to preserve weight, the present invention utilizes an air-core. However, either an iron core or an air-core may be used, and that core may be either ferromagnetic or non-ferromagnetic depending upon the weight constraints and the targeted application. Furthermore, the present invention utilizes either two-pole embodiments or multi-pole embodiments depending upon the desired performance and energy output conditions. Still further, low profile, aluminum litz wires are used as the conductive path, however, various other forms of low-inductance conductors may be used. Still further, although two armature windings are shown stacked, multiple armature windings can be stacked provided the resulting configuration is symmetrical and produces the desired balancing effect. Therefore, it is the Applicants' intention in the following claims to cover all such equivalent modifications and variations that fall within the true spirit and scope of this invention. This invention has been described by way of illustration rather than by limitation and it should be apparent that it is equally applicable in fields other than those described.

What is claimed is:

1. A pulsed alternator, comprising:
   a rotor having a longitudinal axis of rotation;
   a first coil mounted on an outer periphery of said rotor and centered abut a radius of said rotor, said radius being substantially perpendicular to said longitudinal axis; and
   a second coil mounted on said outer periphery of said rotor and centered about said radius, said second coil being radially displaced from said first coil;
   said first and second coils being connected whereby Lorentz forces generated by said coils along said longitudinal axis are substantially balanced when a high energy current is discharged through said coils.

2. The alternator as recited in claim 1, further comprising:
   a low impedance load; and
   means for routing said discharged current to said load.

3. The alternator as recited in claim 1,
   said first coil residing within the arcuate surface having a vertical centerline extending substantially perpendicular to said radius and substantially parallel to said longitudinal axis; and
   said second coil being substantially identical to said first coil rotated 180 degrees about said radius and rotated 180 degrees about the vertical centerline.

4. The alternator as recited in claim 1,
   said first coil residing within an arcuate surface having a horizontal centerline extending substantially perpendicular to said longitudinal axis and radius; and
   said second coil being substantially identical to said first coil rotated 180 degrees about said horizontal centerline.

5. A pulsed alternator, comprising:
   a rotor having a longitudinal axis of rotation; an excitation winding mounted within said rotor;
   a first coil mounted on an outer periphery of said rotor and centered about a radius of said rotor, said radius being substantially perpendicular to said longitudinal axis; and
   a second coil mounted on said outer periphery of said rotor and centered about said radius, said second coil being radially displaced from said first coil;
   said first and second coils being connected whereby Lorentz forces generated by said coils along said longitudinal axis are substantially balanced when a high energy current is discharged through said coils and excitation current is discharged through said excitation winding.

6. The alternator as recited in claim 5, further comprising at least two field coils adapted to produce a magnetic field across said rotor in response to said excitation current received upon said field coils.

7. A pulsed alternator, comprising:
   a rotor;
   a plurality of paris of stacked inner and outer armature coils mounted circumferentially about an outer periphery of said rotor;
   each pair of stacked armature coils including:
   a first coil mounted on an outer periphery of said rotor and centered about a radius of said rotor, said radius being substantially perpendicular to said longitudinal axis; and
   a second coil mounted on said outer periphery of said rotor and centered about said radius, said second coil being radially displaced from said first coil;
   said first and second coils being connected whereby Lorentz forces generated by said coils along said longitudinal axis are substantially balanced when a high energy pulsed current is discharged through said coils.

8. A pulsed alternator, comprising:
   a stator encasement;
   at least two energizeable field coils mounted on an inner surface of said stator encasement and adapted to form a magnetic field therebetween;
   a substantially cylindrical rotor rotatable about a longitudinal axis and within said magnetic field, said rotor having a substantially arcuate outer surface;
   a first main armature coil having a first conductive path mounted on said outer surface of said rotor and centered about a radius of said rotor, said radius being substantially perpendicular to said longitudinal axis; and
   a second main armature coil having a second conductive path mounted on said outer surface of said rotor and centered about said radius, said second conductive path being substantially identical to said first conductive path and being transposed relative to and radially displaced from said first conductive path;
   whereby Lorentz forces generated by said conductive paths along said longitudinal axis are substantially balanced when a high energy current is discharged through said conductive paths.

9. The alternator as recited in claim 8, wherein said field coil comprises a plurality of field conductors arranged in a coil for receiving excitation current.

10. The alternator as recited in claim 9, wherein said excitation current is provided from excitation windings placed within said rotor.

11. The alternator as recited in claim 9, wherein said excitation current is provided from an external current source.

12. The alternator as recited in claim 8, further comprising:
   a shaft connected to at least one end of said rotor along the longitudinal axis of said rotor;
   main brush slip rings coupled to said shaft at a point external to said stator encasement; and
   upper and lower pole start conductors connected between each said inner main armature coil and said main brush slip rings, said upper and lower pole start conductors also connected between each said outer main armature coil and said main brush slip rings.

13. The alternator as recited in claim 8, wherein each conductive path comprises a plurality of braided aluminum litz wires retained upon the outer surface of said rotor by an armature banding configured radially above each conductive path.

14. The alternator as recited in claim 12, wherein each said upper and lower pole start conductors comprise end points extending outside each said upper and lower main armature coil and connected to said main brush slip rings.

15. The alternator as recited in claim 8, wherein said stator encasement and rotor are composed of nonconductive, nonmagnetic material.

16. The alternator as recited in claim 8, further comprising a compensating winding means placed on an inside surface of said stator encasement for minimizing an internal inductance of said alternator.

17. The alternator as recited in claim 8, wherein each said first main armature coil comprises a plurality of first wires bounded together and wound within an arcuate surface having a vertical centerline extending substantially perpendicular to said respective radius and substantially parallel to said longitudinal axis, and wherein said second main armature coil comprises a plurality of second wires bonded together and arranged in a wound configuration substantially identical to said wound first wires rotated 180 degrees about said radius and rotated 180 degrees about said vertical centerline.

18. The alternator as recited in claim 8, wherein each said first main armature coil comprises a plurality of first wires bound together and wound within an arcuate surface having a horizontal centerline extending substantially perpendicular to said radius and longitudinal axis, and wherein said second main armature coil comprises a plurality of second wires bound together and arranged in a wound configuration substantially identical to said wound first wires rotated 180 degrees about said horizontal centerline.

19. A pulsed alternator, comprising:
   a substantially cylindrical rotor having a longitudinal axis surrounded by an arcuate surface;
   a rotatable shaft connected to said rotor and extending along the longitudinal axis of said rotor;
   at least one pair of inner main armature coils mounted circumferentially about said arcuate surface and substantially equidistant from each other, each pair being centered about a diameter of said rotor;
   at least one pair of outer main armature coils, each outer coil being mounted to said rotor and spaced radially from each inner main armature coil and being centered about said diameter;
   each said inner and outer coil including a plurality of inner and outer wires, respectively, said inner and outer wires configured to discharge high energy pulsed current through said wires in response to rotational movement of said shaft;
   said inner and outer wires being wound in a substantially planar configuration with a horizontal centerline extending within said plane and extending substantially perpendicular to said longitudinal axis, said inner and outer wires having upper and lower pole start conductor ends which extend within said plane and outside said inner and outer coils;
   said outer wires being symmetrically arranged with respect to said inner wires, whereby said outer wires are rotated about said horizontal centerline to maintain substantial balance of Lorentz forces along said longitudinal axis when said high energy current is discharged;
   main brush slip rings mounted on an end of said shaft and electrically coupled to said upper and lower pole start ends; and
   a low impedance device electrically coupled to said brush mechanism.

20. The alternator as recited in claim 19, wherein said low impedance device comprises an electromagnetic railgun launcher.

21. The alternator as recited in claim 19, further comprising:
   a stator encasement;
   at least two field coils mounted on an inner surface of said stator encasement; and
   said field coils configured to receive excitation current from an excitation armature coil placed within said rotor.

22. The alternator as recited in claim 19, further comprising:
   a stator encasement;
   at least two field coils mounted on an inner surface of said stator encasement; and
   said field coils configured to receive excitation current from an external current source.

23. The alternator as recited in claim 19, wherein said inner and outer wires comprise aluminum litz wires.

24. The alternator as recited in claim 19, wherein said rotor is composed of graphite, fiberglass and epoxy composite materials.

25. The alternator as recited in claim 19, wherein said high energy discharge current exceeds 3.2 million amps at a pulse length substantially equal to 6 milliseconds.

* * * * *

UNITED STATES PATENT AND TRADEMARK OFFICE
CERTIFICATE OF CORRECTION

PATENT NO. : 5,210,452

DATED : May 11, 1993

INVENTORS : Pratap et al.

It is certified that error appears in the above-identified patent and that said Letters Patent is hereby corrected as shown below:

In column 11, line 32, (claim 1) change "abut" to --about--.

In column 11, line 48, (claim 3) change "the" to --an--.

Signed and Sealed this

Eleventh Day of January, 1994

Attest:

BRUCE LEHMAN

Attesting Officer        Commissioner of Patents and Trademarks